(12) United States Patent
Jordan, III et al.

(10) Patent No.: US 12,480,558 B2
(45) Date of Patent: Nov. 25, 2025

(54) 3-AXIS TUNABLE METAL ISOLATOR

(71) Applicant: Raytheon Company, Waltham, MA (US)

(72) Inventors: Albert R. Jordan, III, Tucson, AZ (US); Peter H. Vo, Oro Valley, AZ (US); Brian B. Greer, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 555 days.

(21) Appl. No.: 17/398,270

(22) Filed: Aug. 10, 2021

(65) Prior Publication Data
US 2023/0047168 A1 Feb. 16, 2023

(51) Int. Cl.
| | | |
|---|---|---|
| F16F 7/116 | (2006.01) | |
| F16F 1/02 | (2006.01) | |
| F16F 15/06 | (2006.01) | |
| G01D 11/24 | (2006.01) | |

(52) U.S. Cl.
CPC .............. *F16F 7/116* (2013.01); *F16F 1/028* (2013.01); *F16F 15/06* (2013.01); *G01D 11/245* (2013.01); *F16F 2230/0017* (2013.01); *F16F 2230/36* (2013.01)

(58) Field of Classification Search
CPC .......................... F16F 1/028; F16F 2230/0017
See application file for complete search history.

(56) References Cited

U.S. PATENT DOCUMENTS

| | | | |
|---|---|---|---|
| 8,262,051 B2 | 9/2012 | Vo et al. | |
| 2007/0194508 A1* | 8/2007 | Bucciero | F16F 1/028 267/182 |

FOREIGN PATENT DOCUMENTS

| | | | | |
|---|---|---|---|---|
| EP | 271355 A | * | 6/1988 | ........... B23B 31/207 |
| EP | 1777433 A1 | * | 4/2007 | ........... F02M 47/027 |
| JP | 2002503324 A | * | 1/2002 | |
| KR | 20060072430 A | * | 6/2006 | |
| KR | 20180114651 A | * | 10/2018 | |
| WO | WO2020025707 A | * | 2/2020 | |
| WO | WO-2021023464 A1 | * | 2/2021 | .............. F16F 1/028 |

* cited by examiner

*Primary Examiner* — Melody M Burch
(74) *Attorney, Agent, or Firm* — Bachman & LaPointe, P.C.

(57) ABSTRACT

An isolator including a body having a wall with slots that extend through a thickness of the wall from an isolator exterior to an isolator interior; the isolator comprising a center of elasticity; the slots having a cut angle oriented as angled relative to a radial direction orthogonal with an axis of the isolator; and a damping material disposed within at least one of the slots.

16 Claims, 6 Drawing Sheets

3-AXIS TUNABLE METAL ISOLATOR

BACKGROUND

The present disclosure is directed to a multi-axis independently tunable metal isolator configured to exploit unique area moment of inertia for each orthogonal axis.

Sensitive electronics and sensors often require strict pointing in harsh shock and vibration environments. Isolators can reduce the amplitude of these environments but often have unintended effects in axes orthogonal to the input. Many times these sensitive electronics or sensors can have harsh input in multiple axes sequentially or concurrently. This is problematic if accurate sensing has to occur in multiple-axes before, after or during a shock or vibration event. Furthermore, the resonance frequency of isolators in each axis needs to be controlled independently if used for inertial control or optical control.

What is needed is an isolator that can attenuate three axes responsive to three different inputs along those three axes.

SUMMARY

In accordance with the present disclosure, there is provided an isolator comprising a body having a wall with slots that extend through a thickness of the wall from an isolator exterior to an isolator interior; the isolator comprising a center of elasticity; the slots having a cut angle oriented as angled relative to a radial direction orthogonal with an axis of the isolator; and a damping material disposed within at least one of the slots.

A further embodiment of any of the foregoing embodiments may additionally and/or alternatively include the cut angle is configured to align an area moment of inertia of the isolator to obtain a predetermined stiffness in each of three axes of the isolator.

A further embodiment of any of the foregoing embodiments may additionally and/or alternatively include the body is configured to attenuate an input force in each of the three axes of the isolator.

A further embodiment of any of the foregoing embodiments may additionally and/or alternatively include the slots have a slot configuration configured to determine the area moment of inertia of the isolator such that all three linear orthogonal modes are located in a predetermined location and all three rotational orthogonal modes are located in the predetermined location.

A further embodiment of any of the foregoing embodiments may additionally and/or alternatively include the cut angle is configured to determine the area of moment of inertia of the isolator.

A further embodiment of any of the foregoing embodiments may additionally and/or alternatively include the body is configured to control all three axes response independently.

A further embodiment of any of the foregoing embodiments may additionally and/or alternatively include a manipulation of the cut angle changes an area moment of inertia resulting in a predetermined stiffness in each coordinate direction.

In accordance with the present disclosure, there is provided an isolator system for a sensor comprising an isolator comprising a body having a wall with slots that extend through a thickness of the wall from an isolator exterior to an isolator interior; the isolator comprising a center of elasticity; the slots having a cut angle oriented as angled relative to a radial direction orthogonal with an axis of the isolator; a damping material disposed within at least one of the slots; a cup defining a cup interior and a cup exterior, the cup configured to nest within the isolator interior; a sensor coupled to the cup and the isolator, the sensor nested within the cup interior, the sensor having a center of gravity; wherein the center of gravity aligns with the center of elasticity; and the center of elasticity being linear.

A further embodiment of any of the foregoing embodiments may additionally and/or alternatively include the cut angle is configured to align an area moment of inertia of the isolator to obtain a predetermined stiffness in each of three axes of the isolator.

A further embodiment of any of the foregoing embodiments may additionally and/or alternatively include the isolator is configured to attenuate an input force in each of the three axes of the isolator.

A further embodiment of any of the foregoing embodiments may additionally and/or alternatively include the slots have a slot configuration configured to determine the area moment of inertia of the isolator such that all three linear orthogonal modes are located in a predetermined location and all three rotational orthogonal modes are located in the predetermined location.

A further embodiment of any of the foregoing embodiments may additionally and/or alternatively include the cut angle is configured to determine the area of moment of inertia of the isolator.

A further embodiment of any of the foregoing embodiments may additionally and/or alternatively include a manipulation of the cut angle changes an area moment of inertia resulting in a predetermined stiffness in each coordinate direction.

In accordance with the present disclosure, there is provided a process for attenuation of an isolator comprising providing the isolator comprising a body having a wall with slots that extend through a thickness of the wall from an isolator exterior to an isolator interior; the isolator comprising a center of elasticity; the slots having a cut angle oriented as angled relative to a radial direction orthogonal with an axis of the isolator; and a damping material disposed within at least one of the slots; aligning an area moment of inertia of the isolator by configuring the cut angle; and obtaining a predetermined stiffness in each of three axes of the isolator.

A further embodiment of any of the foregoing embodiments may additionally and/or alternatively include the isolator is configured to attenuate an input force in each of the three axes of the isolator.

A further embodiment of any of the foregoing embodiments may additionally and/or alternatively include the process further comprising angling the slots to determine the area moment of inertia of the isolator such that all three linear orthogonal modes are located in a predetermined location and all three rotational orthogonal modes are located in the predetermined location.

A further embodiment of any of the foregoing embodiments may additionally and/or alternatively include the isolator is configured to control all three axes response independently.

A further embodiment of any of the foregoing embodiments may additionally and/or alternatively include process further comprising determining the area of moment of inertia of the isolator by adjusting the cut angle.

Other details of the isolator are set forth in the following detailed description and the accompanying drawings wherein like reference numerals depict like elements.

DETAILED DESCRIPTION

Figure 1:
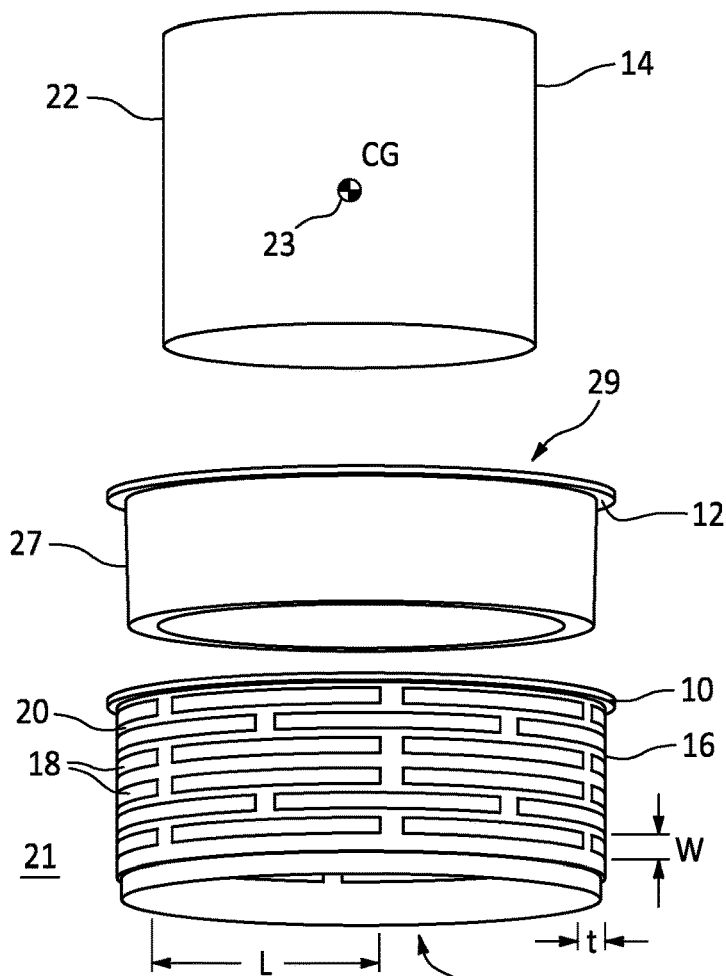
FIG. 1 is a schematic of an exemplary isolator system.

Referring to FIG. 1, an exemplary isolator system can be seen. The isolator 10 can receive a cup 12 that is configured to receive a sensor 14. The isolator 10 is shown as a cylindrical body 16 having multiple slots or cut-outs 18 in a wall 20 of the body 16. The slots 18 can extend through the thickness t of the wall 20 from an exterior 21 to an interior 25 of the isolator 10. The slots 18 can be spaced apart and have varying lengths L and/or widths w. The isolator 10 can be configured with an interior 25 shape that receives an exterior 27 of the cup 12. The cup 12 interior 29 can be shaped to receive the exterior 22 of the sensor 14. The exemplary embodiment depicts the sensor 14 as being a right circular cylinder shape, but alternative shapes are also contemplated. The cup 12 can be adapted to receive the sensor 14. The cup 12 serves the purpose to mount the sensor 14 with the isolator 10 such that the sensor 14 is located vertically and radially with the sensor 14 center of gravity 23 aligned with the isolator 10 center of elasticity 42. The cup 12 can be tailored to locate the sensor 14 with respect to the isolator 10 to maximize the alignment of the center of gravity 23 and the center of elasticity 42.

Figure 3:
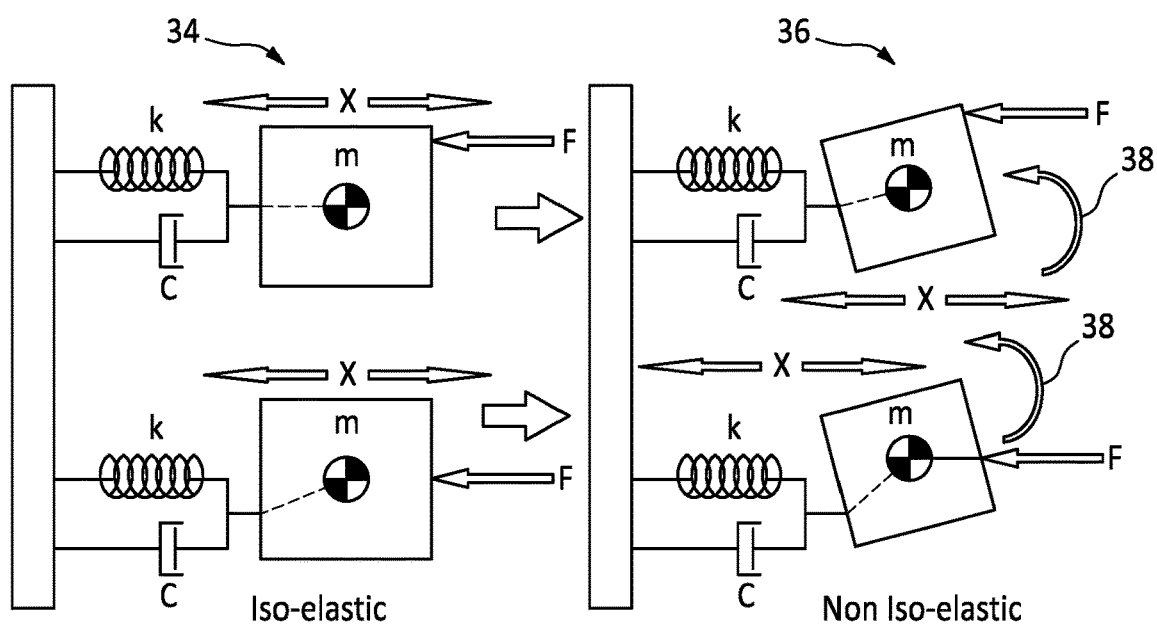
FIG. 3 is a schematic representation comparison of an isolator creating iso-elastic conditions.
Figure 2:
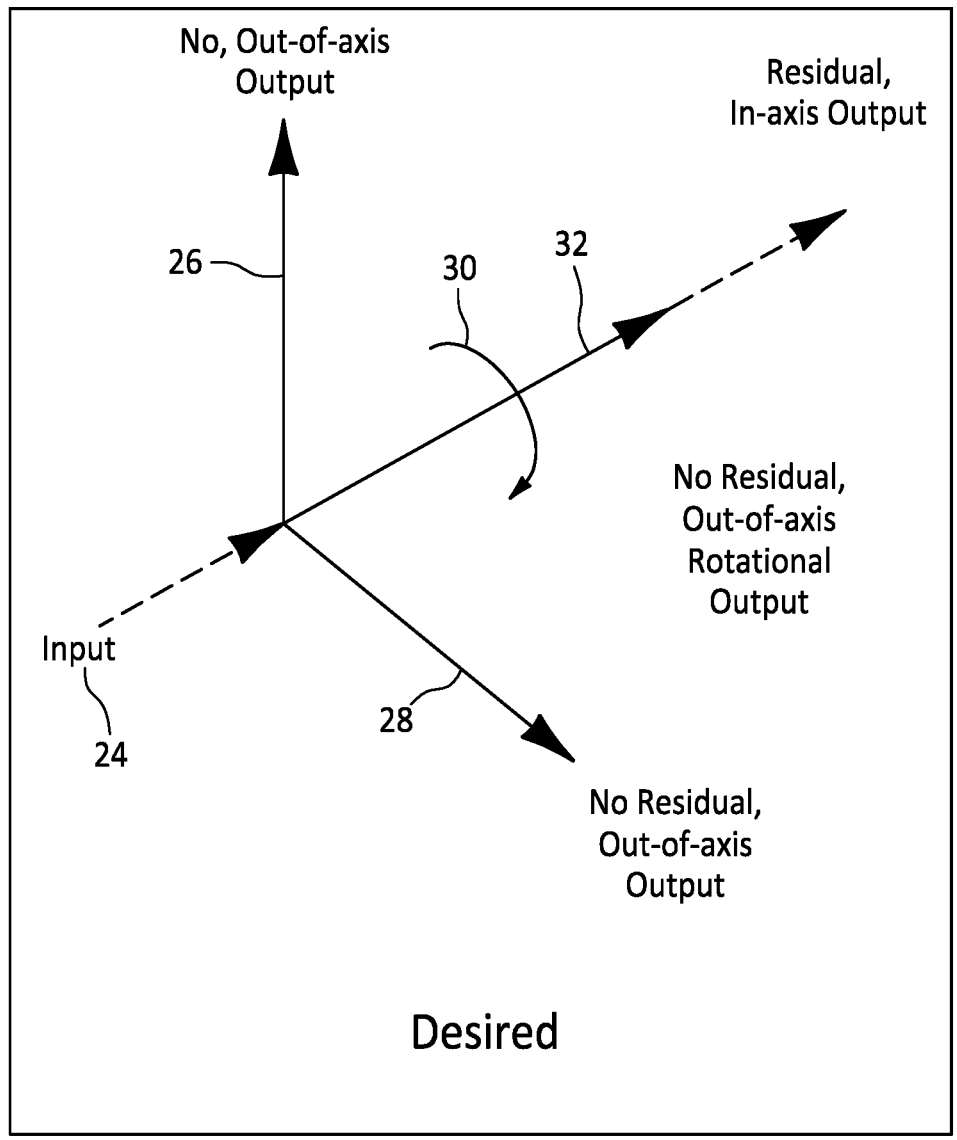
FIG. 2 is a schematic representation of an exemplary response to an input.

Referring also to FIGS. 2 and 3, further illustration is provided depicting the concept of iso-elastic conditions. Many sensors require isolation from harsh vibration and shock environments. Iso-elastic refers to a system of elastic and tensile parts which are arranged in a configuration which isolates physical motion at one end in order to minimize or prevent similar motion from occurring in orthogonal directions of a component. This type of device must be able to maintain angular direction and load-bearing over a large range of motion. As in FIG. 2, for a given input 24, the isolator 10, would provide no out-of-axis output in any of the orthogonal axes 26, 28, or rotational output 30 around the axis 32 that lies along the direction of the input 24. As demonstrated in FIG. 2, the system 34 shows that an iso-elastic condition in all three axes can be created by aligning the stiffness (k) and damping (c) forces all through the center of gravity (m) of the isolated item and preventing communication between axes. The stiffness (k) can be tailored separately for each axis. In contrast, the system 36 demonstrates non iso-elastic conditions where application of the force (F) creates a residual out-of-axis rotational output 38.

Figure 4:
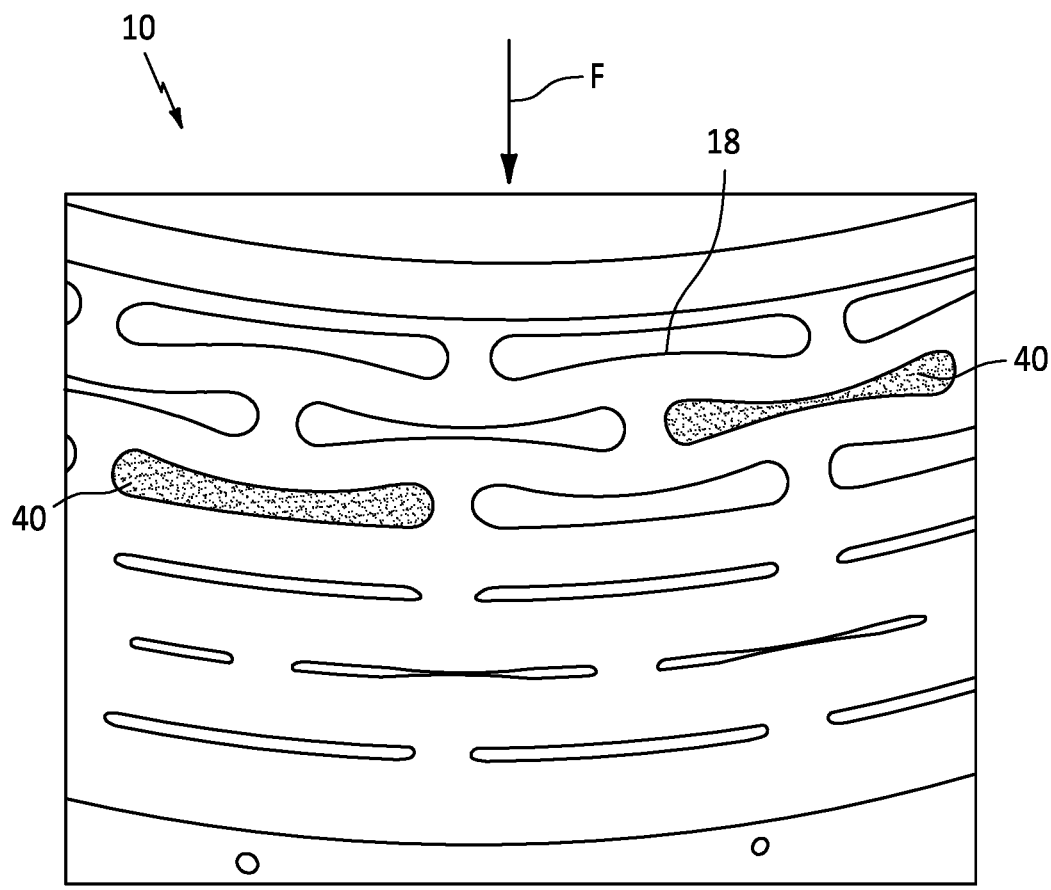
FIG. 4 is a schematic of a portion of an exemplary isolator under compressive load.
Figure 5:
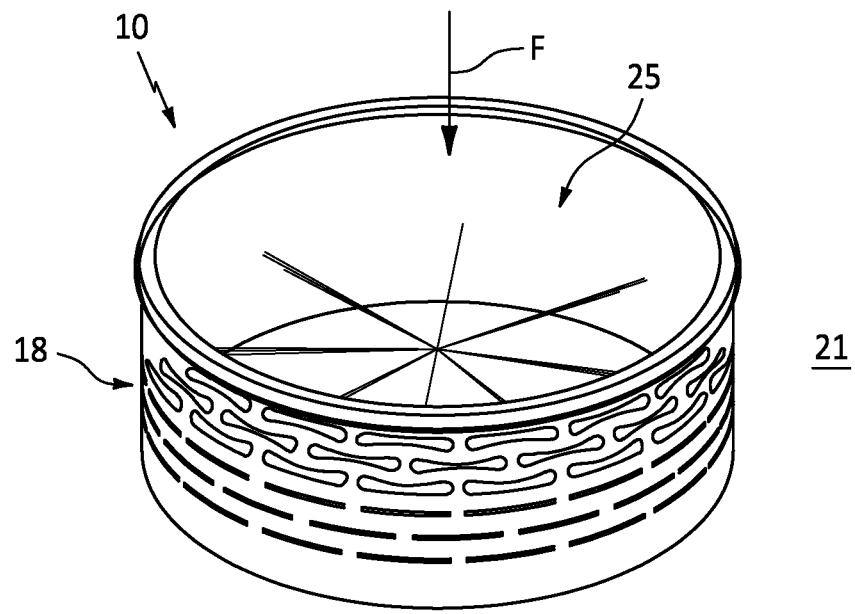
FIG. 5 is a schematic of a portion of an exemplary isolator under longitudinal load.
Figure 6:
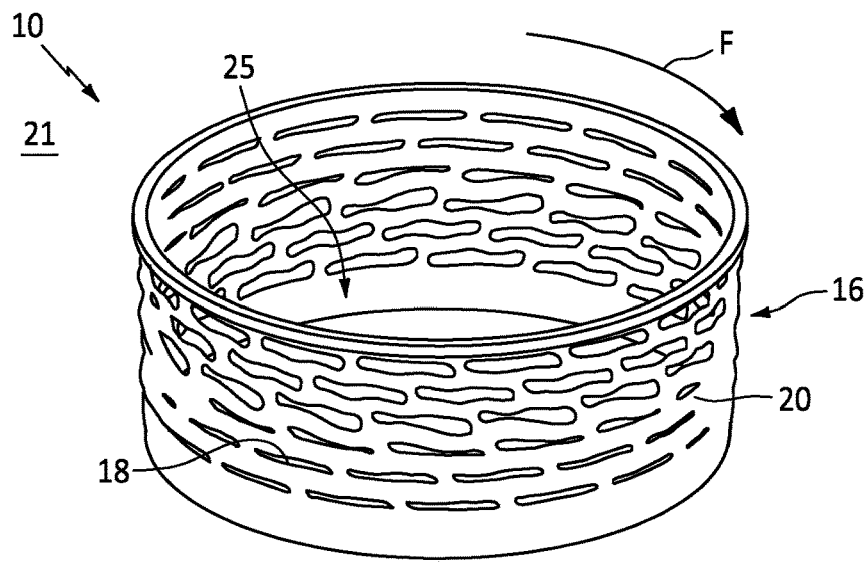
FIG. 6 is a schematic of a portion of an exemplary isolator under torsional load.
Figure 7:
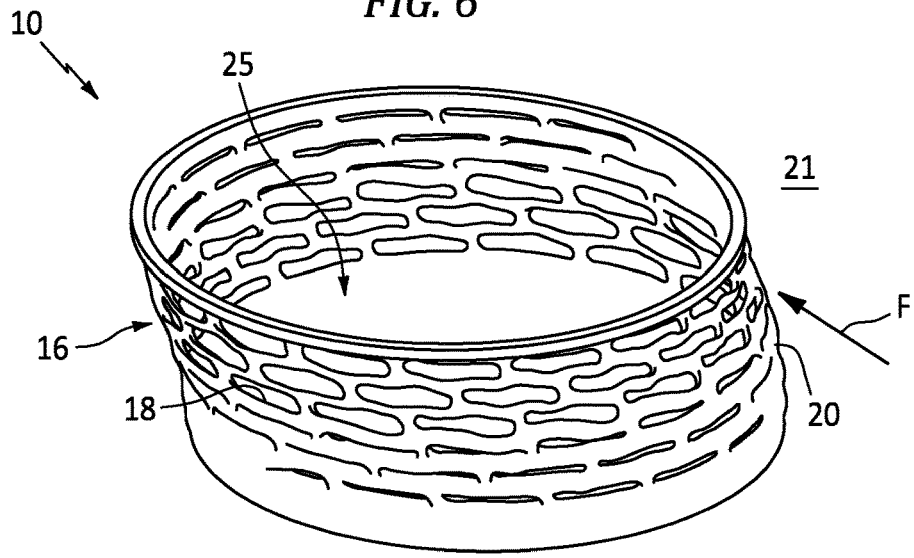
FIG. 7 is a schematic of a portion of an exemplary isolator under radial load.

Referring also to FIGS. 4 through 7 illustrations of the isolator 10 undergoing various forms of loading as the isolator 10 is configured to dissipate energy by bending the material of the isolator 10 under load. As seen in FIG. 4, the isolator 10 includes the slots 18 that can be filled with a damping material 40 such as an elastomer material or similar material with properties similar to elastomer. The damping material 40 is disposed within the slots 18 at predetermined locations and adheres to the slot 18. In an exemplary embodiment the damping material 40 can be disposed in all of the slots 18. As the slots 18 are deflected or deformed in response to the load F, the damping material 40 also deforms responsive to the load force F. FIG. 5 illustrates the response of the isolator 10 to a longitudinal load force F. FIG. 6 illustrates the response of the isolator 10 to a torsional load F. FIG. 7 illustrates the response of the isolator 10 to a radial load F. The slots 18 deflect and shorten in the width w dimension. The damping material 40 also reacts by shortening in compression as well as by shearing between the slots 18. The damping material 40, however avoids the Poisson's effects on stiffness. This is enabled by the angled slot 18 geometry shown in FIG. 8.

Figure 8:
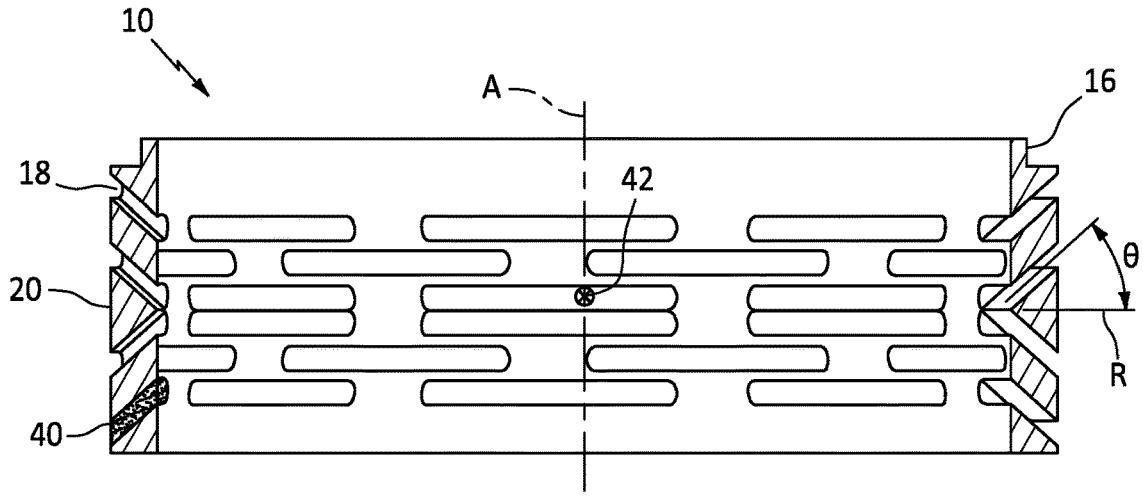
FIG. 8 is a cross-sectional schematic of an exemplary isolator.
Figure 9:
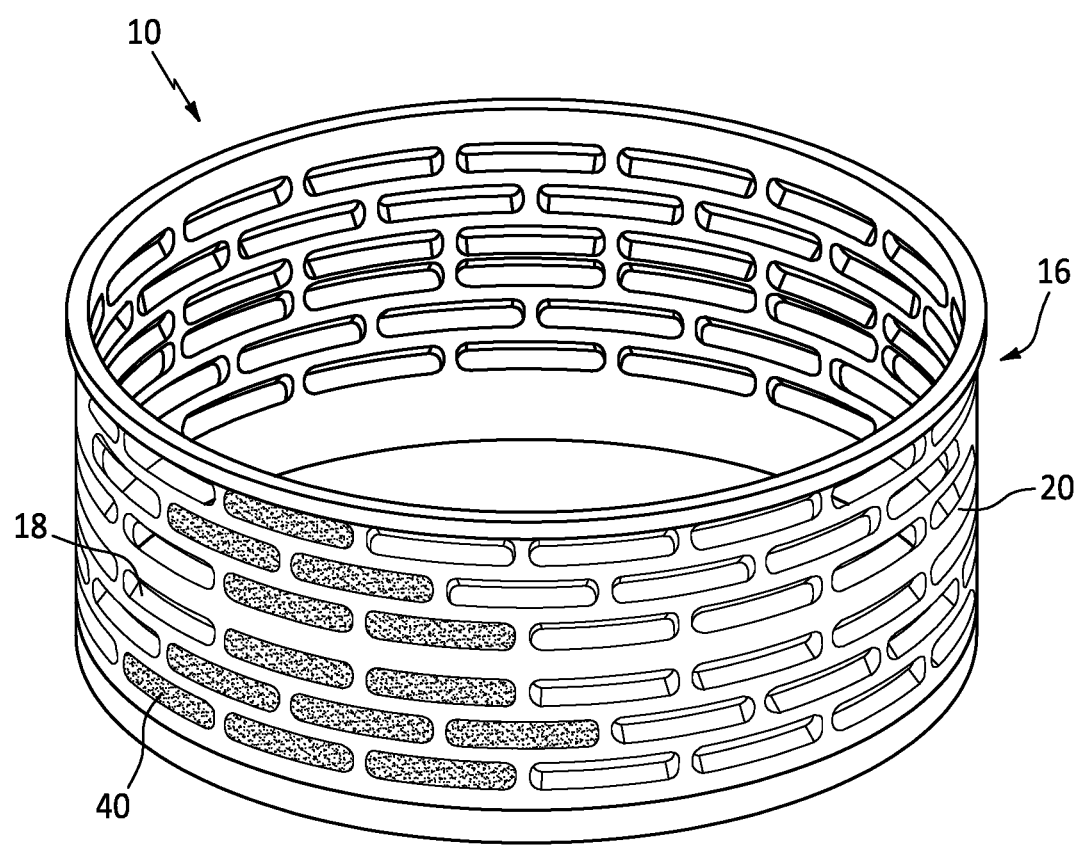
FIG. 9 is an isometric schematic of an exemplary isolator.
Figure 10:
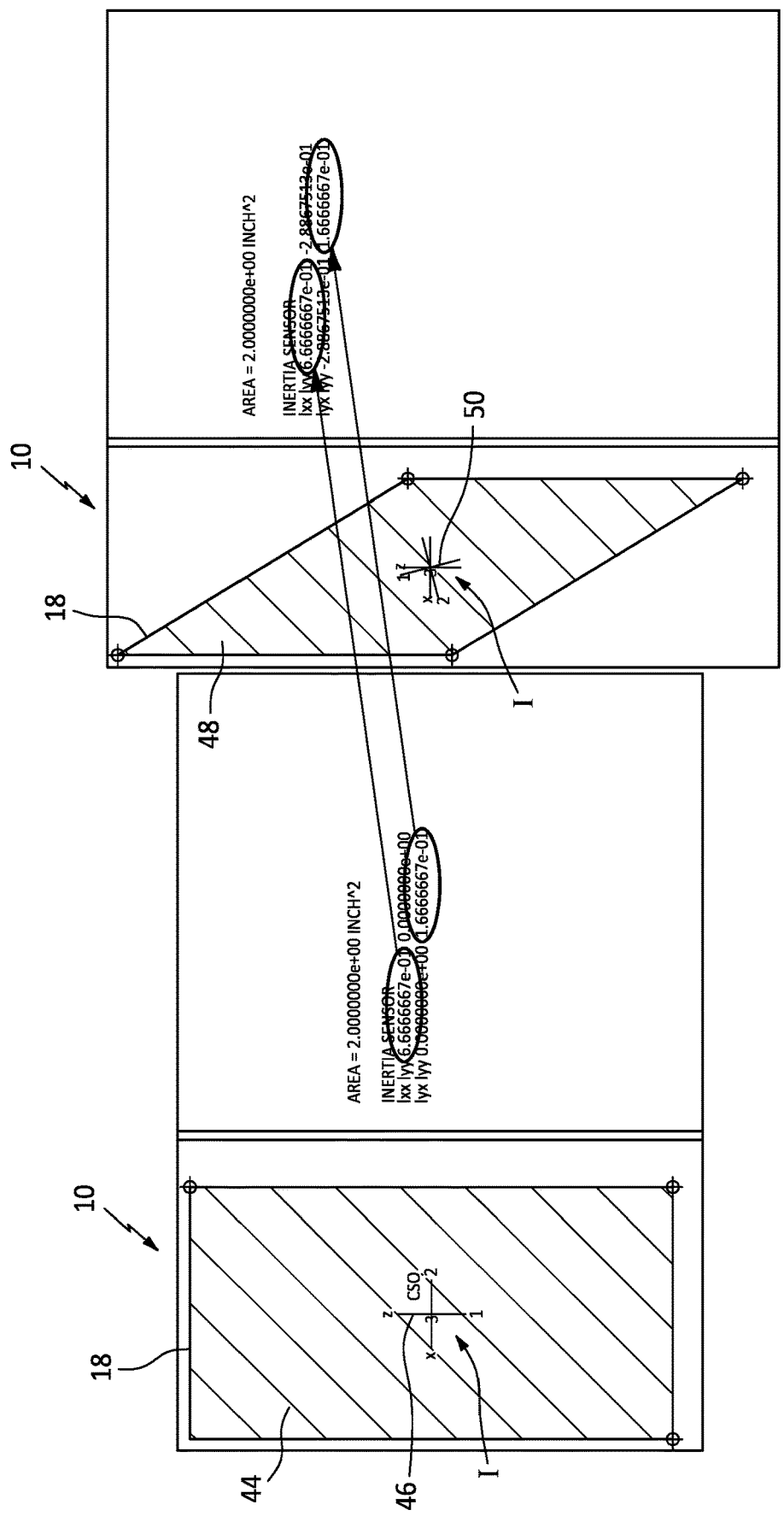
FIG. 10 is schematic comparison of the angle of cut of a portion of an exemplary isolator.

Also referring to FIGS. 8 and 9 showing the cross-sectional and isometric view of the isolator 10. The slots 18 of the isolator 10 are oriented as angled or canted relative to radial direction R orthogonal with an axis A of the isolator 10. The angle $\theta$ can be configured between about 20 degrees to about 70 degrees. The angle $\theta$ can be cut at various angles in the isolator 10 wall 20. Also referring to FIG. 10, in an exemplary embodiment, the angle $\theta$ can be adjusted to tune the geometry of the slot 18 and damping material 40 in order to manipulate the area moment of inertia I of the isolator 10. An area moment of inertia I is a geometrical property of an area which reflects how its points are distributed with regard to an arbitrary axis. Area moment of inertia is the primary driver of stiffness (k) in any given axis. In an exemplary embodiment, the area moment of inertia I is manipulated by the configuration of the slots 18 such that all three linear orthogonal modes are located in predetermined frequency allocations and all three rotational orthogonal modes are located in the predetermined frequency allocations. By changing the angle $\theta$ of the cut the area of moment of inertia value can be altered. The cross section alpha 44 has a moment of inertia 46 with respect to the X-Y coordinates. The moment of inertia about the X-X axis and Y-Y axis are highly interdependent when using standard rectangular or circular cross-sectional shapes. After manipulation of the cross section beta 48 the moment of inertia 50 with respect to the X-Y coordinates has changed, due to the angle $\theta$ of the cut of the slot 18. The angle of the cut allows for an additional degree of freedom to limit the interdependence of the moment of inertia about the X-X axis and the moment of inertia about the Y-Y axis. Manipulation of the cut angle $\theta$ changes the area moment of inertia I to modify the stiffness S desired in each coordinate direction. Stiffness S is a function of material modulus E and area moment of inertia I As seen in FIG. 8, the canted slots 18 can be canted in different directions relative to a center of elasticity 42 of the isolator 10. The configuration of the canted slots 18 determines the center of elasticity 42. In this exemplary embodiment, the cuts are opposite and equal in angle, however they do not have to be if an offset elastic center is desired. Cuts in the exemplary embodiment are symmetric about the axis A in FIG. 8. This dictates that the center of elasticity will be along the axis, however, cuts could be varied around the perimeter of the isolator to move the center of elasticity radially.

As seen in FIG. 8, the angle of the canted slots can be defined to balance damping from shear and compression of the elastomer or like material. This is desirable to create a type of damping force response that is needed for the isolated sensor 22 in FIG. 1. This desired damping force response could be linear, typically requiring wide, steep-angled slots. The desired damping response could be progressive, typically requiring narrow, shallow-angled slots 18. The material properties of the damping material 40 can influence the nature of the angled slots 18.

A technical advantage of the isolator disclosed can include the capacity to control all three axes responses independently.

Another technical advantage of the isolator disclosed can include the use of slanted cuts for the slots of the isolator such that the area moment of inertia can be altered to obtain a desired stiffness and damping.

Another technical advantage of the isolator disclosed can include a metal isolator that can be tuned to create the desired effect in all three orthogonal axes.

Another technical advantage of the isolator disclosed can include an isolator with a tunable geometry that exploits axis-specific area moment of inertia.

Another technical advantage of the isolator disclosed can include an isolator that allows the stiffness and damping to be tuned independently for each axis in the same structure that is often the same machined part.

There has been provided an isolator. While the isolator has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An isolator comprising:
 a body having a wall with slots that extend through a thickness of the wall from an isolator exterior to an isolator interior; said isolator comprising a center of elasticity;
 said slots having a cut angle oriented as angled along a radial direction orthogonal with an axis of the isolator, wherein said cut angle aligns an area moment of inertia of said isolator to obtain a predetermined stiffness in each of three axes of said isolator wherein the area moment of inertia is manipulated by a configuration of the slots such that all three linear orthogonal modes are located in predetermined frequency allocations and all three rotational orthogonal modes are located in the predetermined frequency allocations; and
 a damping material disposed within at least one of said slots.

2. The isolator according to claim 1, wherein said body attenuates an input force in each of said three axes of said isolator.

3. The isolator according to claim 1, wherein the slots have a slot configuration configured to determine said area moment of inertia of said isolator such that all three linear orthogonal modes are located in a predetermined location and all three rotational orthogonal modes are located in the predetermined location.

4. The isolator according to claim 3, wherein said cut angle determines the area of moment of inertia of the isolator.

5. The isolator according to claim 1, wherein said body controls all three axes response independently.

6. The isolator according to claim 1, wherein a manipulation of the cut angle changes an area moment of inertia resulting in a predetermined stiffness in each coordinate direction.

7. An isolator system for a sensor comprising:
 an isolator comprising a body having a wall with slots that extend through a thickness of the wall from an isolator exterior to an isolator interior; said isolator comprising a center of elasticity;
 said slots having a cut angle oriented as angled along a radial direction orthogonal with an axis of the isolator, wherein said cut angle aligns an area moment of inertia of said isolator to obtain a predetermined stiffness in each of three axes of said isolator, wherein the area moment of inertia is manipulated by a configuration of the slots such that all three linear orthogonal modes are located in predetermined frequency allocations and all three rotational orthogonal modes are located in the predetermined frequency allocations;
 a damping material disposed within at least one of said slots;
 a cup defining a cup interior and a cup exterior, said cup configured to nest within the isolator interior;
 a sensor coupled to said cup and said isolator, said sensor nested within said cup interior, said sensor having a center of gravity; wherein said center of gravity aligns with said center of elasticity; and
 said center of elasticity being linear.

8. The isolator system according to claim 7, wherein said isolator is configured to attenuate an input force in each of said three axes of said isolator.

9. The isolator system according to claim 7, wherein the slots have a slot configuration determines said area moment of inertia of said isolator such that all three linear orthogonal modes are located in a predetermined location and all three rotational orthogonal modes are located in the predetermined location.

10. The isolator system according to claim 7, wherein said cut angle determines the area of moment of inertia of the isolator.

11. The isolator system according to claim 7, wherein a manipulation of the cut angle changes an area moment of inertia resulting in a predetermined stiffness in each coordinate direction.

12. A process for attenuation of an isolator comprising:
 providing the isolator comprising a body having a wall with slots that extend through a thickness of the wall from an isolator exterior to an isolator interior; said isolator comprising a center of elasticity; said slots having a cut angle oriented as angled along a radial direction orthogonal with an axis of the isolator; and a damping material disposed within at least one of said slots;
 aligning an area moment of inertia of said isolator by configuring said cut angle;
 angling the slots to determine said area moment of inertia of said isolator such that all three linear orthogonal modes are located in a predetermined location and all three rotational orthogonal modes are located in the predetermined location; and
 obtaining a predetermined stiffness in each of three axes of said isolator.

13. The process of claim 12, wherein said isolator attenuates an input force in each of said three axes of said isolator.

14. The process of claim 12, further comprising:
manipulating the area moment of inertia by a configuration of the slots such that all three linear orthogonal modes are located in predetermined frequency allocations and all three rotational orthogonal modes are located in the predetermined frequency allocations.

15. The process of claim 12, wherein said isolator controls all three axes response independently.

16. The process of claim 12, further comprising:
determining the area of moment of inertia of the isolator by adjusting said cut angle.

* * * * *